(No Model.)
W. BONNAR.
SPRING GEAR FOR VEHICLES
No. 493,677. Patented Mar. 21, 1893.
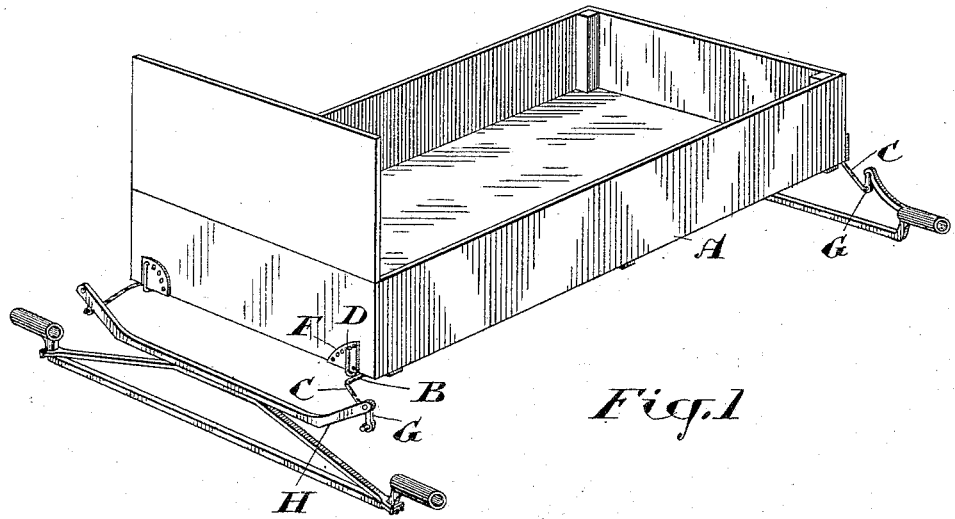
Fig. 1
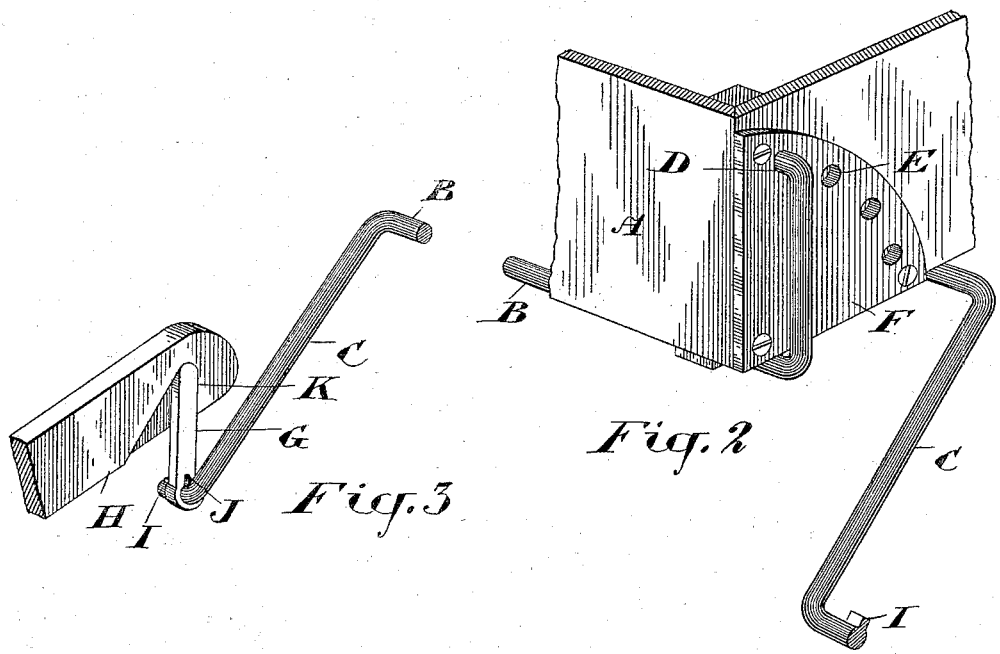
Fig. 2
Fig. 3
Witnesses
W. G. McMillan
J. Edw. Maybee
Inventor
William Bonnar
by Donald C. Ridout & Co.
attys

United States Patent Office.

WILLIAM BONNAR, OF MONO MILLS, CANADA.

SPRING-GEAR FOR VEHICLES.

SPECIFICATION forming part of Letters Patent No. 493,677, dated March 21, 1893.

Application filed June 6, 1892. Serial No. 435,661. (No model.)

*To all whom it may concern:*

Be it known that I, WILLIAM BONNAR, of the village of Mono Mills, in the county of Peel, in the Province of Ontario, Canada, have invented a certain new and Improved Spring-Gear for Vehicles, of which the following is a specification.

The object of the invention is to provide a cheaply constructed easy riding spring gear for vehicles, and it consists in the peculiar construction, arrangement and combinations of parts hereinafter more particularly described and then definitely claimed.

In the accompanying drawings—Figure 1, is a perspective view of my improved torsion spring gear connected to the running gear of a vehicle. Fig. 2, is an enlarged perspective view of a corner of the body of a vehicle showing the ends of my torsion spring. Fig. 3, is an enlarged detail showing the manner of connecting the crank to the bolster.

On each side of the bottom of the vehicle A, I fix two rods marked B. On one end of each rod B, I form a crank C, and at the other end of the said rod I provide means by which it may be rigidly held from revolving. In the drawings I show suitable means for this purpose, that is to say—I bend the end D, of the rod B, in such a shape as shown in Fig. 2 that it may be fitted into one of the holes E, made in the plate F, which is fixed as indicated to the corner of the vehicle A. By thus fixing the end of the rod B, opposite to that on which the crank C, is made, the said crank may be set and held at any desired angle.

G, is a link pivoted to the bolster H, or to some other suitable part of the running gear of the vehicle and pivotally connected to the end of the crank C, which is bent outwardly, as indicated, and has a key I, formed on it as shown. This key slips through a key-way J, made in the link G, and when set at an angle, acts as a lock to hold the said link onto the said crank.

In practice I prefer that each rod B, should be adjusted and held so that its crank-arm C, shall be at an angle of about forty-five degrees in order that when the weight is placed in the vehicle, a torsion strain is directed against each rod B, thereby furnishing the necessary elasticity to give the required easy riding motion to the vehicle. When the weight is placed on the vehicle A, the end of each crank arm C, moves inwardly, carrying the link G, with it, and should the weight be increased, the said arm continues to move inwardly until the crank-arm C, becomes horizontal, after which point any increase of weight will cause the swinging link G, to move outwardly until it reaches the shoulder K, formed on the bolster, thereby holding the link from any further movement, and as a consequence, any further twisting strain on the rod B, is prevented.

In order that the angle of the crank-arm C, may be altered as required, I provide the extra holes C, as shown, and put the end D, into any one of the holes desired.

What I claim as my invention is—

1. An improved vehicle spring gear consisting of four torsion rods B, each rod placed longitudinally upon the bottom of the vehicle A, and having a crank C, formed on one end of it and connected by the link G, to the bolster H, or other part of the running gear of the vehicle, in combination with a plate F, having holes E, arranged to receive the bent end D, of the rod B; substantially as and for the purpose specified.

2. An improved vehicle spring gear consisting of four torsion rods B, each rod placed longitudinally upon the bottom of the vehicle A, and having a crank C, formed on one end of it and connected to the link G by the key I, and the bolster H, connected to the link G, in combination with a plate F, having holes E, arranged to receive the bent end D of the rod B; substantially as and for the purpose specified.

Mono Mills, May 20, 1892.

WILLIAM BONNAR.

In presence of—
 JOSEPH PATTULLO,
 ALBERT JACOBS.